United States Patent
Tai et al.

(10) Patent No.: US 7,148,666 B1
(45) Date of Patent: Dec. 12, 2006

(54) DIRECT CURRENT VOLTAGE BOOSTING/BUCKING DEVICE

(75) Inventors: Liang-Pin Tai, Chu-Pei (TW); Chun-Tsung Chen, Taipei (TW); Chin-Chiang Yeh, Kaohsiung Hsien (TW); Po-Shun Chung, Taichung Hsien (TW); Kwan-Jen Chu, Hsin-Chu (TW); Chung-Lung Pai, Hsin-Chu (TW)

(73) Assignee: Richtek Technology Corp., Chupei (TW)

( * ) Notice: Subject to any disclaimer, the term of this patent is extended or adjusted under 35 U.S.C. 154(b) by 1 day.

(21) Appl. No.: 11/183,611

(22) Filed: Jul. 18, 2005

(30) Foreign Application Priority Data

May 20, 2005 (TW) .............................. 94116517 A

(51) Int. Cl.
*G05F 1/56* (2006.01)
(52) U.S. Cl. ..................................... 323/274
(58) Field of Classification Search ............... 323/273, 323/274, 282, 284, 349, 351; 327/541
See application file for complete search history.

(56) References Cited

U.S. PATENT DOCUMENTS

| | | | | |
|---|---|---|---|---|
| 5,589,761 A * | 12/1996 | Nelson et al. | ............... | 323/285 |
| 6,617,832 B1 * | 9/2003 | Kobayashi | ................... | 323/266 |
| 6,661,683 B1 * | 12/2003 | Botker et al. | .................. | 363/60 |
| 6,703,815 B1 * | 3/2004 | Biagi | .......................... | 323/280 |
| 6,956,429 B1 * | 10/2005 | Elbanhawy | ................. | 327/541 |

* cited by examiner

*Primary Examiner*—Adolf Berhane
(74) *Attorney, Agent, or Firm*—Kirschstein, et al.

(57) ABSTRACT

A direct current voltage boosting/bucking device includes a direct current voltage boosting circuit and a low drop-out (LDO) linear voltage converting circuit. The direct current voltage boosting circuit boosts an input voltage so as to generate an output voltage higher than the input voltage. The LDO linear voltage converting circuit converts the output voltage into a load voltage that is to be provided to a load, and controls the direct current voltage boosting circuit in accordance with a feedback signal from the load such that the output voltage and the load voltage have a minimum drop-out voltage differential therebetween and such that current flow through the load is maintained at a determined level.

8 Claims, 9 Drawing Sheets

DIRECT CURRENT VOLTAGE BOOSTING/BUCKING DEVICE

CROSS-REFERENCE TO RELATED APPLICATION

This application claims priority of Taiwanese application no. 094116547, filed on May 20, 2005.

BACKGROUND OF THE INVENTION

1. Field of the Invention

The invention relates to a direct current voltage boosting/bucking device, more particularly to a direct current voltage boosting/bucking device suitable for driving operation of a high-power light-emitting diode.

2. Description of the Related Art

Current camera phones generally employ a high-power light-emitting diode for supplying light when taking pictures. Hence, a driver circuit is required for driving operation of the light-emitting diode.

FIG. 1 illustrates a conventional driver circuit 1 for a high-power light emitting diode (D). The driver circuit 1 utilizes a direct current voltage boosting chip 11 for boosting an input voltage (Vin) from an input voltage source (such as a battery of a mobile phone) so as to generate an output voltage (Vout) that is higher than the input voltage (Vin) and that is provided to the light-emitting diode (D). It is noted that the input voltage (Vin) must be lower than the output voltage (Vout) in order to ensure normal operation of the direct current voltage boosting chip 11. However, since the voltage range of the input voltage source (e.g., a lithium battery) is usually between 4.2 volts and 3.3 volts, in the case where the input voltage (Vin) is 4.2 volts, the output voltage (Vout) must be higher than 4.2 volts (e.g., 4.3 volts). Therefore, when the light-emitting diode (D) has a working voltage ($V_F$) of 3.2 volts and a working current ($I_{LED}$) of 700 mA, in order to ensure that only an appropriate portion of the output voltage (Vout) will be present across the light-emitting diode (D) (which only requires 3.2 volts), a resistor (R3) must be coupled in series to the light-emitting diode (D) to bear the excess voltage portion (i.e., 4.3−3.2=1.1 volts). Moreover, in order to enable the direct current voltage boosting chip 11 to generate the fixed output voltage (Vout) (e.g., 4.3 volts), series-connected resistors (R1, R2) must be provided between an output terminal (OUT) and a feedback terminal (FB) of the direct current voltage boosting chip 11, and between the feedback terminal (FB) and the resistor (R3). Therefore, through a feedback voltage that is fed back to the direct current voltage boosting chip 11 and that is set by the resistances of the resistors (R1, R2), the direct current voltage boosting chip 11 is controlled to generate the fixed output voltage (Vout) (e.g., 4.3 volts).

In the aforementioned driver circuit 1, it is noted that a considerable amount of power is consumed by the resistor (R3) such that the power conversion and utilization rates are significantly low. FIG. 2 shows experimental results for the conventional driver circuit 1 to illustrate the power conversion rates for different input voltages (Vin) when the working current ($I_{LED}$) is 600 mA. It is evident from the data that the power conversion rates decrease with a reduction in the magnitude of the input voltage (Vin). In addition, a change in the working voltage ($V_F$) of the light-emitting diode (D) necessitates corresponding adjustments in the resistances of the resistors (R1, R2, R3) in the driver circuit 1.

FIG. 3 illustrates another conventional driver circuit 2 for a high-power light emitting diode (D). The driver circuit 2 utilizes a synchronous buck-boost driver chip 21 (such as LTC3453) that receives an input voltage (Vin) from an input voltage source (such as a lithium battery) and that performs voltage boosting or voltage bucking so as to generate a suitable output voltage (Vout) for driving the light-emitting diode (D). During operation of the driver circuit 2, the working current ($I_{LED}$) flowing through the light emitting diode ($I_{LED}$) is continuously detected. When the working current ($I_{LED}$) is less than a preset value, a voltage boosting action is conducted to increase the output voltage (Vout) On the other hand, when the working current ($I_{LED}$) becomes larger than (or at least equal to) the preset value, a voltage bucking action is conducted to decrease the output voltage (Vout). As a result, the working voltage ($V_F$) and the working current ($I_{LED}$) of the light emitting diode (D) can be maintained at the respective preset value for driving the light-emitting diode (D) to generate a fixed intensity output. FIG. 4 shows experimental results for the conventional driver circuit 2 to illustrate the power conversion rates for different input voltages (Vin) when the working current ($I_{LED}$) is 150 mA. It is evident from the data that the power conversion rates for the driver circuit 2 are higher than those for the conventional driver circuit 1 of FIG. 1. However, the synchronous buck-boost driver chip 21 requires four MOS transistors (Q1, Q2, Q3, Q4) so as to be able to perform the voltage boosting and voltage bucking operations, which results in higher costs incurred for the driver circuit 2.

SUMMARY OF THE INVENTION

Therefore, the object of the present invention is to provide a direct current voltage boosting/bucking device that can overcome at least one of the aforesaid drawbacks associated with the prior art.

According to the present invention, a direct current voltage boosting/bucking device is adapted for driving a load, and comprises a direct current voltage boosting/bucking circuit and a low drop-out (LDO) linear voltage converting circuit.

The direct current voltage boosting circuit boosts an input voltage so as to generate an output voltage higher than the input voltage.

The LDO linear voltage converting circuit is adapted to be coupled electrically to the load, is coupled electrically to the direct current voltage boosting circuit for converting the output voltage into a load voltage that is to be provided to the load, and controls the direct current voltage boosting circuit in accordance with a feedback signal from the load such that the output voltage and the load voltage have a minimum drop-out voltage differential therebetween and such that current flow through the load is maintained at a determined level.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 5:
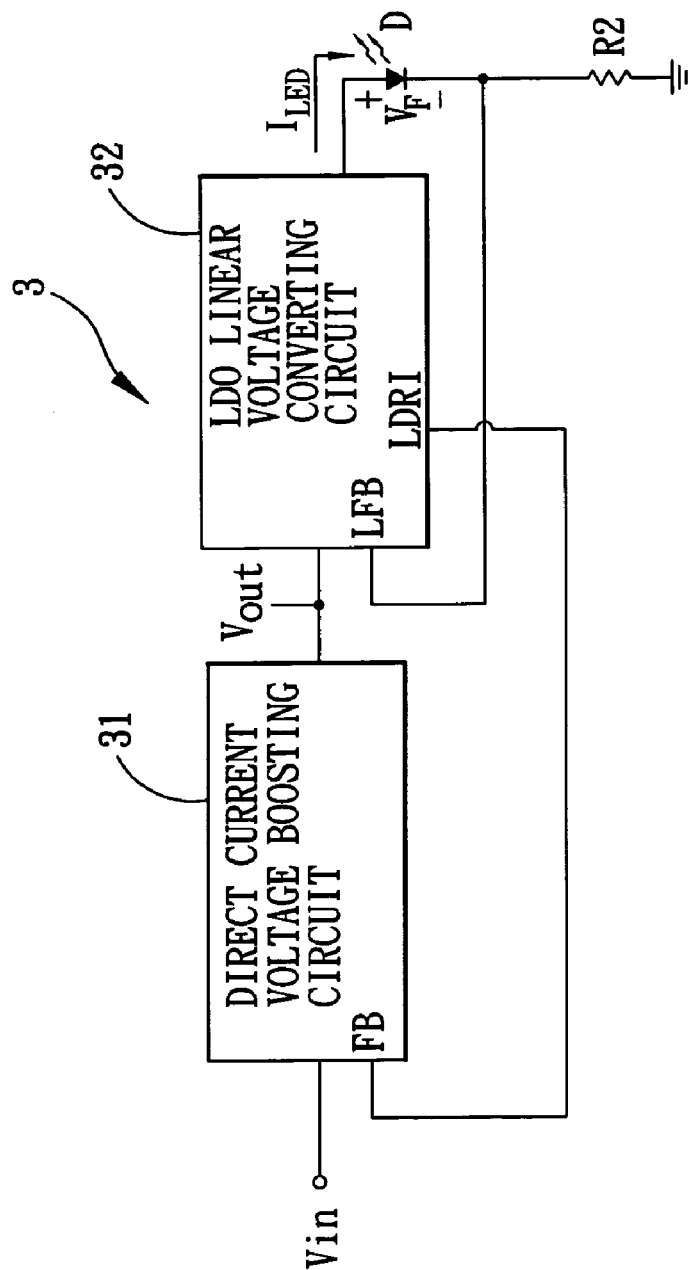
FIG. 5 is a block diagram of the preferred embodiment of the direct current voltage boosting/bucking device according to the present invention.

Referring to FIG. 5, the preferred embodiment of a direct current voltage boosting/bucking device 3 according to the present invention is adapted for application to a camera phone so as to drive operation of a high-power light-emitting diode (D) for supplying light when taking pictures. However, it should be noted that the above application of the preferred embodiment is solely for the sake of illustration and should not be interpreted as being limited exclusively thereto.

The direct current voltage boosting/bucking device 3 comprises a direct current voltage boosting/bucking circuit 31 and a low drop-out (LDO) linear voltage converting circuit 32.

Figure 6:
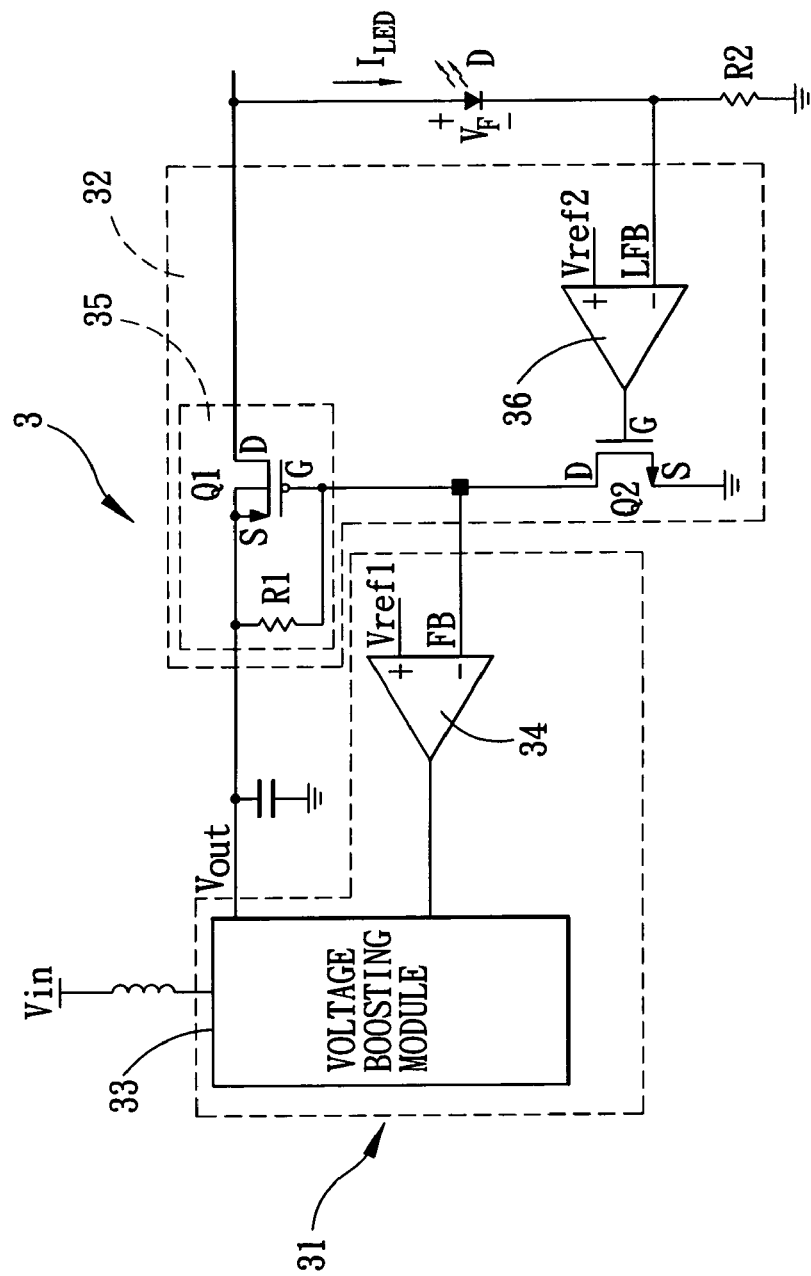
FIG. 6 is a schematic circuit diagram of the preferred embodiment.
Figure 7:
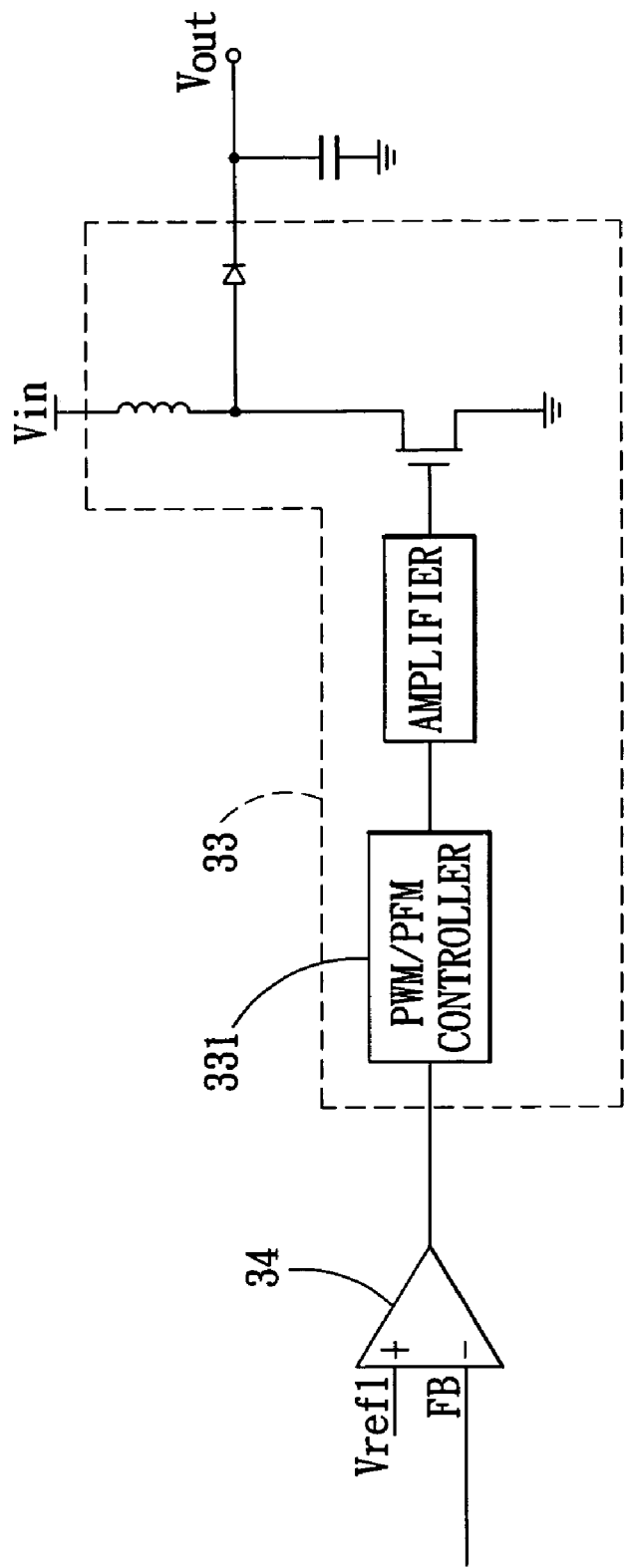
FIG. 7 is a schematic circuit diagram to illustrate a direct current voltage boosting circuit of the preferred embodiment in greater detail.

As shown in FIG. 6, the direct current voltage boosting circuit 31 is a conventional booster that boosts an input voltage (Vin) so as to generate an output voltage (Vout) higher than the input voltage (Vin). The direct current voltage boosting circuit 31 includes a voltage boosting module 33 and a first comparator 34. With further reference to FIG. 7, the voltage boosting module 33 includes a PWM (or PFM) controller 331, and is used to receive and boost the input voltage (Vin). The first comparator 34 has a first input that receives a first reference voltage (Vref1)(e.g., 0.8 volt), a second input that receives a feedback signal (FB), and an output that is coupled electrically to the PWM (or PFM) controller 331. The first comparator 34 controls boosting operation of the voltage boosting module 33 by controlling the duty cycle of an output signal generated by the PWM (or PFM) controller 331 in a manner to be described hereinafter.

Referring once again to FIG. 6, the LDO linear voltage converting circuit 32 is a conventional voltage bucking circuit, is adapted to be coupled electrically to a load, is coupled electrically to the direct current voltage boosting circuit 31 for converting the output voltage (Vout) into a load voltage that is to be provided to the load, and controls the direct current voltage boosting circuit 31 in accordance with a feedback signal (LFB) from the load such that the output voltage (Vout) and the load voltage have a minimum drop-out voltage differential (such as 0.1 volt) therebetween, and such that current flow through the load is maintained at a determined level.

In this embodiment, the load is a series connection of a high-power light-emitting diode (D) and a resistor (R2).

The LDO linear voltage converting circuit 32 includes a voltage regulating module 35, a second comparator 36, and a NMOS transistor (Q1). The voltage regulating module 35 receives, bucks, and regulates the output voltage (Vout) so as to generate the load voltage. In this embodiment, the voltage regulating module 35 includes a PMOS transistor (Q1) and a resistor (R1). The PMOS transistor (Q1) has a source to receive the output voltage (Vout) of the direct current voltage boosting circuit 31, a gate, and a drain adapted to be coupled electrically to a terminal of the light-emitting diode (D). The resistor (R1) is connected between the source and the gate of the PMOS transistor (Q1). The second comparator 36 has a first input that receives a second reference voltage (Vref2) (e.g., 0.2 volt), a second input that receives the feedback signal (LFB) (i.e., the voltage drop across the resistor (R2)) from a junction of the resistor (R2) and another terminal of the light-emitting diode (D), and an output. The NMOS transistor (Q2) has a gate connected to the output of the second comparator 36, a drain connected to the second input of the first comparator 34 and the gate of the PMOS transistor (Q1), and a grounded source. The second comparator 36 controls operation of the NMOS transistor (Q2) in accordance with the feedback signal (LFB) so as to control in turn operations of the first comparator 34 of the direct current voltage boosting circuit 31 and the PMOS transistor (Q1) of the voltage regulating module 35. Taking the lithium battery of a camera phone as an example, the input voltage (Vin) supplied by the lithium battery usually ranges between 3.3 volts and 4.2 volts. In the case of a light-emitting diode (D) having a working voltage ($V_F$) of 3.3 volts and a working current ($I_{LED}$) of 200 mA, since the second reference voltage (Vref2) of the second comparator 36 is set to 0.2 volt, the resistance of the resistor (R2) can be determined accordingly such that, when the current flowing through the light-emitting diode (D) reaches 200 mA (i.e., the value of the working current ($I_{LED}$)), the load voltage from the LDO linear voltage converting circuit 32 is maintained at a determined level of 3.5 volts (that is, the sum of the working voltage (VF) of the light-emitting diode (D) (i.e., 3.3 volts) and the voltage drop across the resistor (R2) (i.e., 0.2 volt)).

Therefore, as shown in FIG. 6, in the case where the input voltage (Vin) is 3.3 volts, when the device 3 is powered on, since the current initially flowing through the light-emitting diode (D) is almost equal to zero, the feedback signal (LFB) at the second input of the second comparator 36 is lower than the second reference voltage (Vref2) (i.e., 0.2 volt). The output of the second comparator 36 is at a high logic level so as to trigger the NMOS transistor (Q2) to conduct. The drain of the NMOS transistor (Q2) is pulled to a low logic level such that the first comparator 34 outputs a high-logic signal for controlling the voltage boosting module 33 to boost the input voltage (Vin) quickly (that is, the output signal generated by the controller 331 (see FIG. 7) has a longer duty cycle). The output voltage (Vout) generated by the direct current voltage boosting circuit 31 is provided to the voltage regulating module 35. At this time, since the drain of the NMOS transistor (Q2) is at the low logic level, the PMOS transistor (Q1) is in a short-circuited state, and the output voltage (Vout) is provided directly to the light-emitting diode (D) until the output voltage (Vout) reaches 3.5 volts (that is, the sum of the working voltage (VF) of the light-emitting diode (D) (i.e., 3.3 volts) and the voltage drop across the resistor (R2) (i.e., 0.2 volt)). The light-emitting diode (D) then conducts, and the current flowing through the light-emitting diode (D) reaches 200 mA (i.e., the working current ($I_{LED}$) of the light-emitting diode (D)). At this moment, the feedback signal (LFB) at the second input of the second comparator 36 becomes higher than (or at least equal to) the second reference voltage (Vref2) (i.e., 0.2 volt), and the output of the second comparator 36 changes to the low logic level. The NMOS transistor (Q2) ceases to conduct, and the drain of the NMOS transistor (Q2) is pulled to the high logic level. The first comparator 34 responds by providing a low-logic signal for controlling the voltage boosting module 33 to stop increasing the boosting extent of the input voltage (Vin) (that is, the duty cycle of the output signal of the controller 331 is no longer increased). Hence, the output voltage (Vout) is maintained at a level (such as 3.6 volts) slightly higher than the load voltage generated by the voltage regulating module 35 (This is because the response speed of the direct current voltage boosting circuit 31 is slower than that of the LDO linear voltage converting circuit 32). The LDO linear voltage converting circuit 32 then proceeds with voltage conversion (i.e., regulation) so as to convert the output voltage (Vout) from 3.6 volts to the required load voltage of 3.5 volts that is supplied to the load. Therefore, apart from the function of maintaining the load current flowing through the light-emitting diode (D) at a determined level so that the light-emitting diode (D) is able to generate a fixed intensity output, only a slight voltage differential is present between the input voltage of the voltage regulating module 35 (i.e., the output voltage (Vout) of the direct current voltage boosting circuit 31) and the load voltage, thereby resulting in a marked increase (3.3/3.6=91%) in the utilization (i.e., conversion) rate of the power source.

On the other hand, in the case where the input voltage (Vin) is 4.2 volts, initial operation of the device 3 results in the feedback signal (LFB) at the second input of the second comparator 36 that causes the second comparator 36 to trigger the NMOS transistor (Q2) to conduct, thereby enabling the first comparator 34 to output the high-logic signal for controlling the voltage boosting module 31 to boost the input voltage (Vin) and to enable the voltage regulating module 35 to provide the output voltage (Vout) to the light-emitting diode (D). However, since the output voltage (Vout) (e.g., 4.3 volts) is already larger than the required load voltage of 3.5 volts (that is, the sum of the working voltage (VF) of the light-emitting diode (D) (i.e., 3.3 volts) and the voltage drop across the resistor (R2) (i.e., 0.2 volt)), the feedback signal (LFB) at the second input of the second comparator 36 is higher than the second reference voltage (Vref2) (i.e., 0.2 volt). The output of the second comparator 36 changes to the low logic level, the NMOS transistor (Q2) ceases to conduct, and the first comparator 34 provides the low-logic signal for controlling the voltage boosting module 33 to stop boosting the input voltage (Vin). At the same time, the voltage regulating module 35 operates to convert the output voltage (Vout) to a level, i.e., 3.5 volts, which is required by the load. Therefore, in the case where the input voltage (Vin) is already larger than the required load voltage, the direct current voltage boosting circuit 31 is prevented from boosting the input voltage (Vin), and the voltage regulating module 35 operates to convert (i.e., bucking) and regulate the input voltage (Vin) such that the input voltage (Vin) is reduced to the required load voltage, such as below 3.5 volts. Boosting operation of the voltage boosting module 33 is enabled once again until the output voltage (Vout) is slightly larger than the required load voltage from the voltage regulating module 35, which subsequently results in stopping of the boosting operation of the voltage boosting module 33. As a result, there is a minimum voltage differential between the input voltage and the output voltage of the voltage regulating module 35 to ensure an optimum conversion efficiency.

Moreover, even in the case of a drift in the working voltage ($V_F$) of the light-emitting diode (D) due to a difference in specifications or manufacturing bias voltages, since the LDO linear voltage converting circuit 32 performs feedback control of the direct current voltage boosting circuit 31 and the voltage regulating module 35 according to a feedback voltage generated by the current flowing through the light-emitting diode (D) (that is, the feedback signal (LFB) at the second input of the second comparator 36), once the current flowing through the light-emitting diode (D) reaches the working current ($I_{LED}$), the LDO linear voltage converting circuit 32 controls the direct current voltage boosting circuit 31 and the voltage regulating module 35 such that a fixed load voltage (that is, the sum of the working voltage ($V_F$) of the light-emitting diode (D) and the voltage drop across the resistor (R2)) is outputted, thereby maintaining the current flow through the light-emitting diode (D) at a determined level (that is, the working current ($I_{LED}$)). Therefore, regardless of changes in the working voltage ($V_F$) of the light-emitting diode (D), a determined load current can be achieved without the need to modify any portion of the direct current voltage boosting/bucking device 3.

Figure 8:
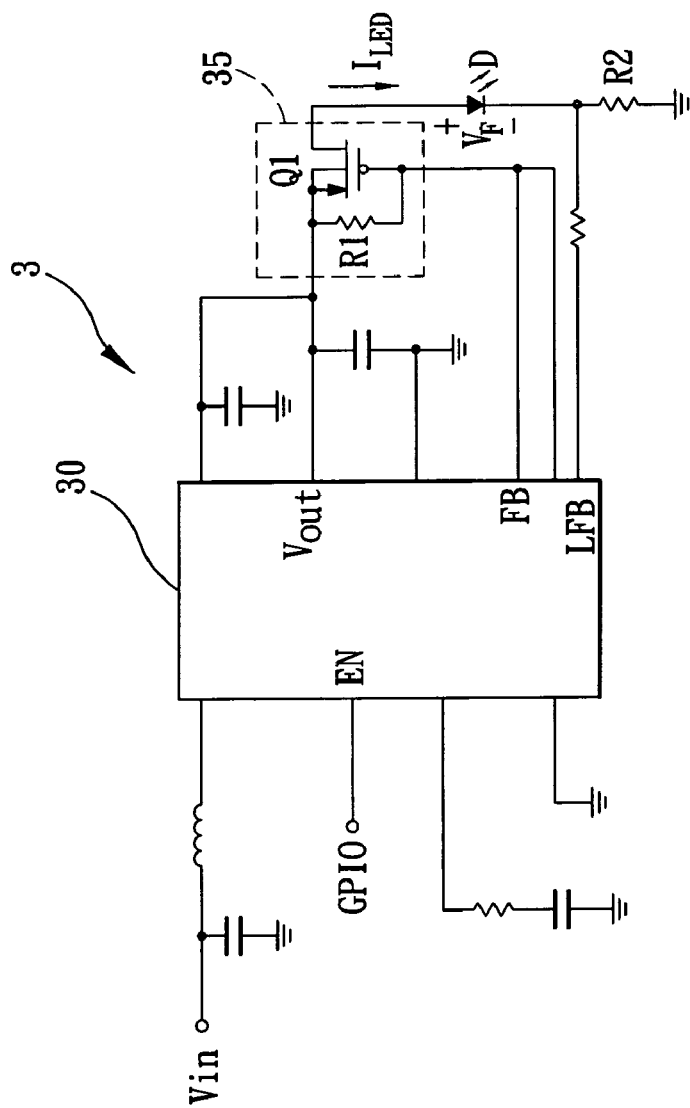
FIG. 8 is a schematic circuit diagram to illustrate an alternative implementation of the device of the present invention.

FIG. 8 illustrates an alternative implementation of the direct current voltage boosting/bucking device 3 of the present invention. As compared to the circuit shown in FIG. 6, the direct current voltage boosting circuit, as well as the second comparator and the NMOS transistor of the LDO linear voltage converting circuit, can be integrated into a single integrated circuit (IC) chip 30.

Figure 9:
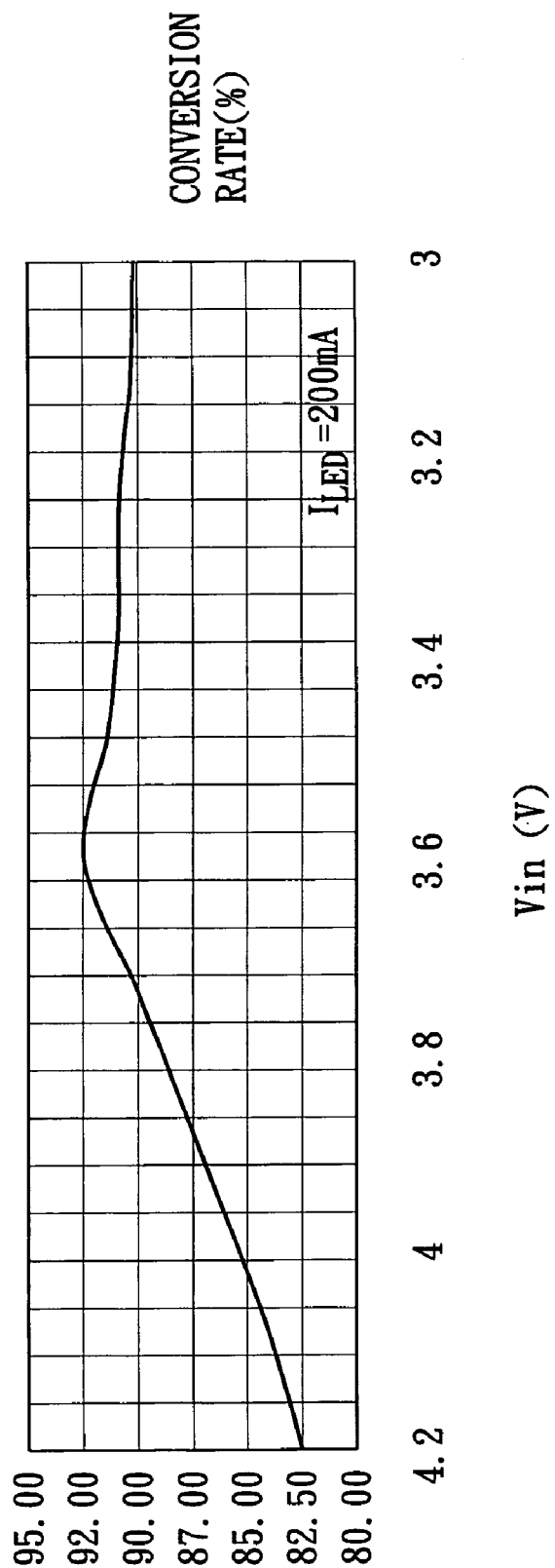
FIG. 9 is a plot showing experimental results for the device of the present invention to illustrate power conversion rates for different input voltages.

FIG. 9 shows experimental results for the device 3 of the present invention to illustrate the power conversion rates for different input voltages (Vin) when the working current ($I_{LED}$) is 200 mA. The conversion rates exceed 90% for input voltages (Vin) in the range of 3 volts to 3.6 volts, and exceed 80% for input voltages (Vin) in the range of 3 volts to 4.2 volts.

It has thus been shown that the present invention utilizes the direct current voltage boosting circuit 31 and the LDO linear voltage converting circuit 32 to form the direct current voltage boosting/bucking device 3 for driving operation of a load, such as a light-emitting diode (D). The LDO linear voltage converting circuit 32 controls operation of the direct current voltage boosting circuit 31 in accordance with a feedback signal from the load. As a result, a fixed load current can be generated regardless of the input voltage (Vin) and the working voltage ($V_F$) of a light-emitting diode load to achieve the object of a stable current output.

Moreover, since the LDO linear voltage converting circuit 32 performs feedback control of the direct current voltage boosting circuit 31 such that the output voltage (Vout) of the direct current voltage boosting circuit 31 is maintained at a level slightly larger than the load voltage generated by the LDO linear voltage converting circuit 32, optimum power conversion and utilization rates are possible in the device 3 of the present invention.

Figure 1:
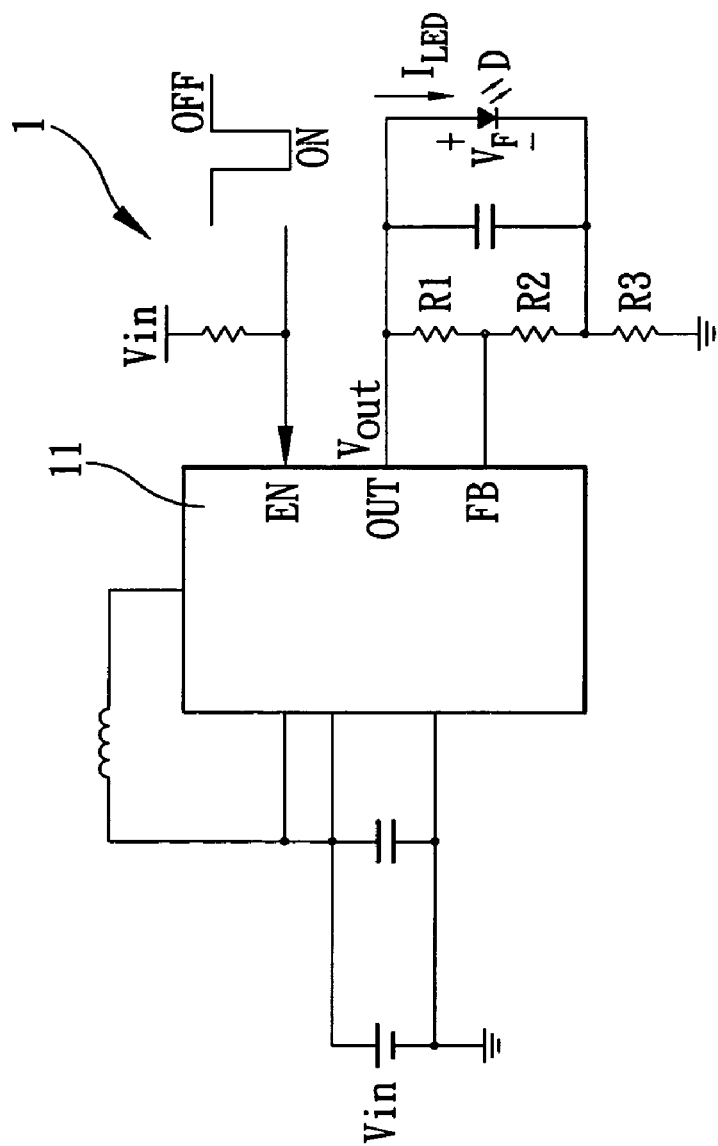
FIG. 1 is a schematic circuit diagram of a conventional driver circuit for a high-power light-emitting diode.
Figure 2:
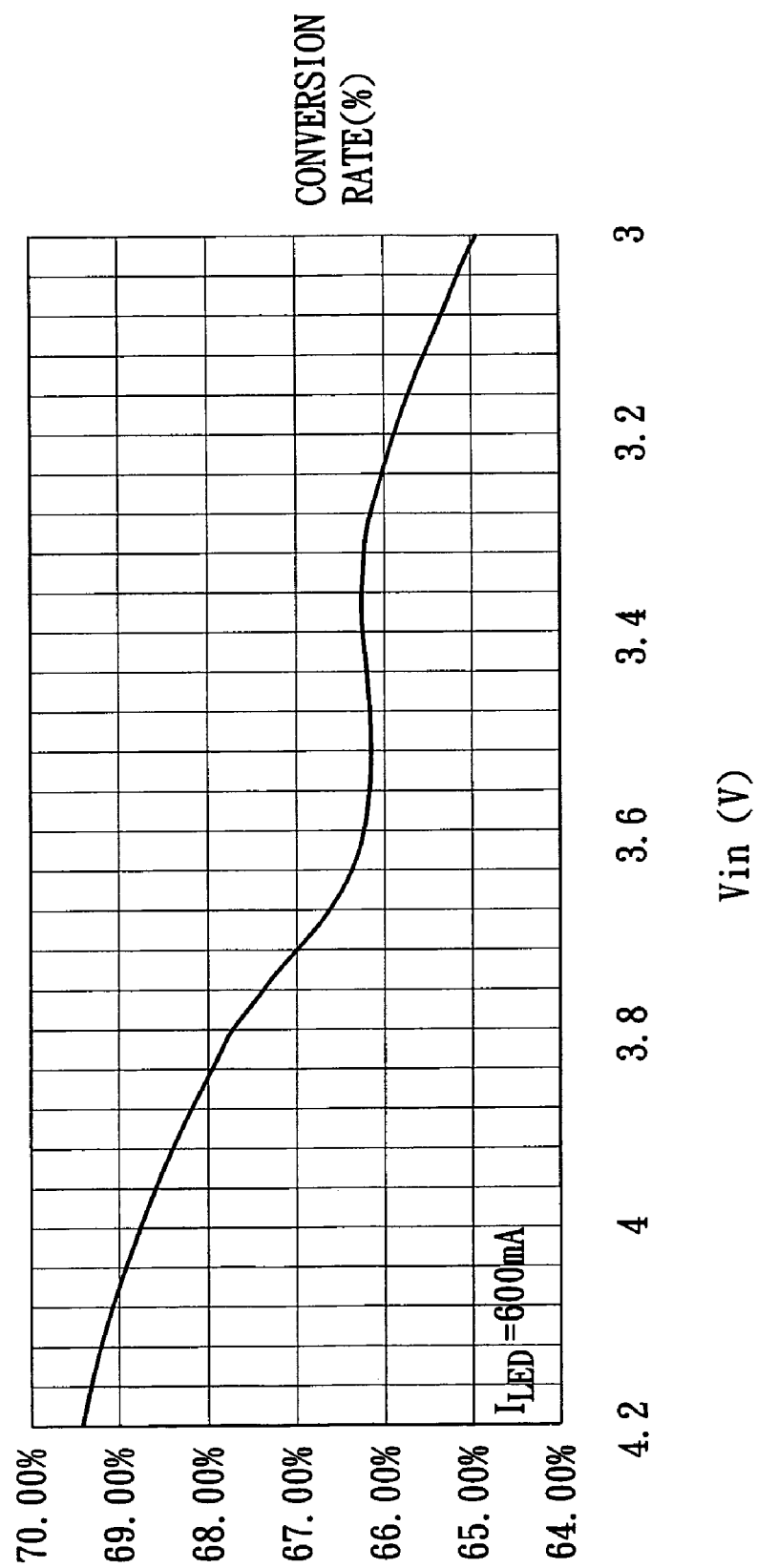
FIG. 2 is a plot showing experimental results for the conventional driver circuit of FIG. 1 to illustrate power conversion rates for different input voltages.
Figure 3:
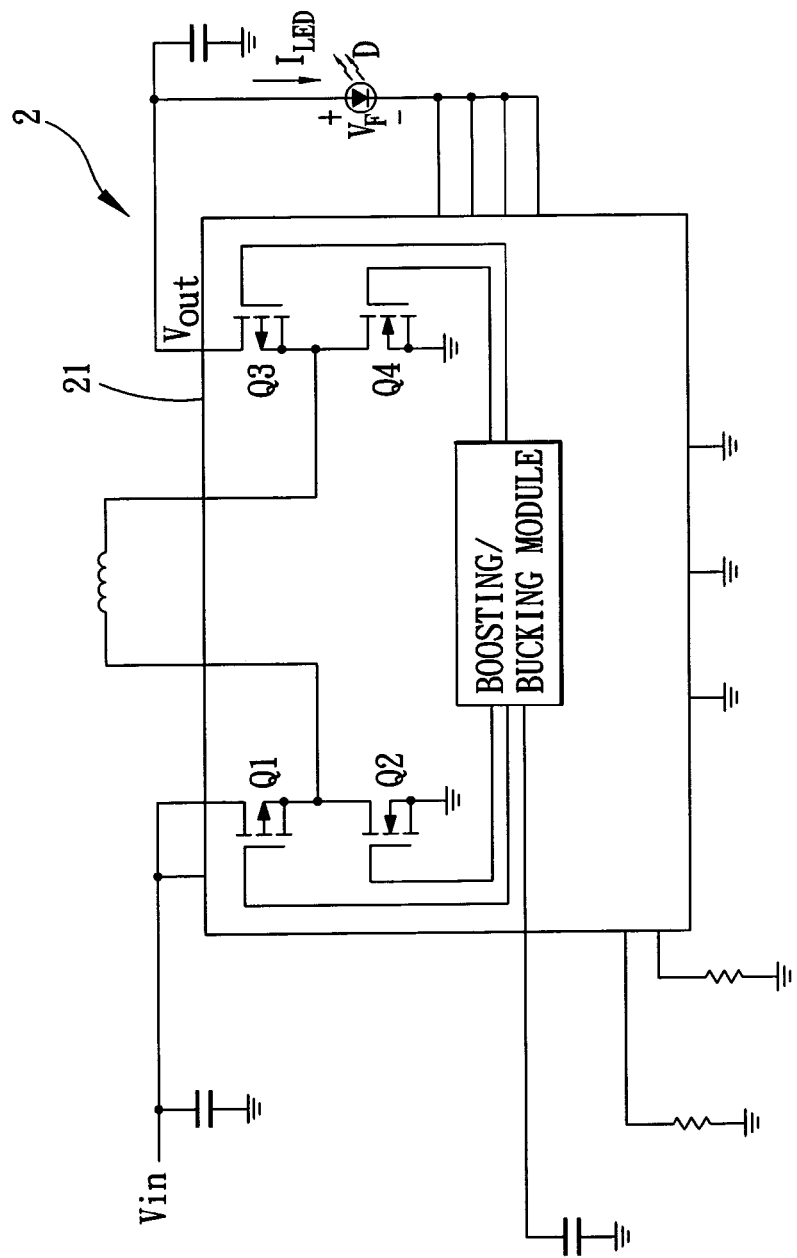
FIG. 3 is a schematic circuit diagram of another conventional driver circuit for a high-power light-emitting diode.
Figure 4:
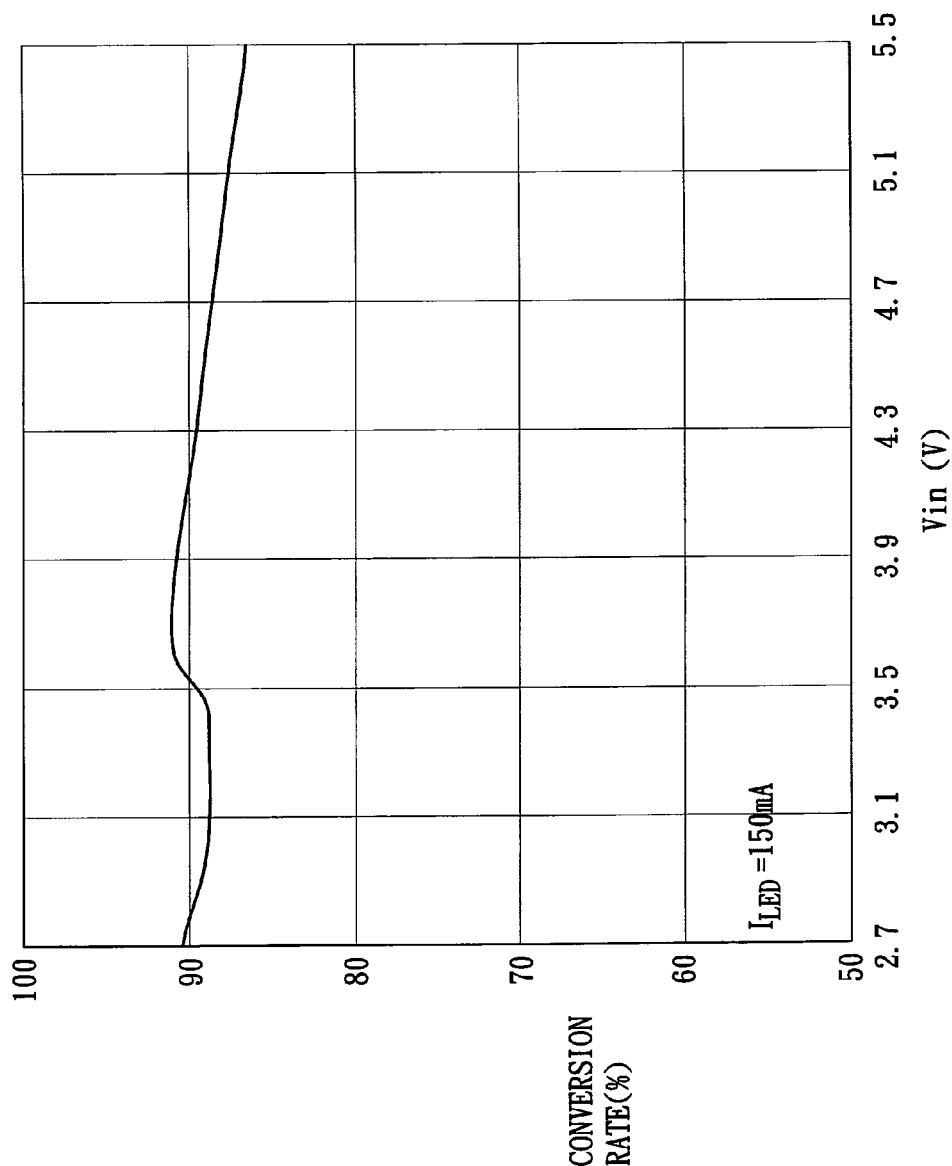
FIG. 4 is a plot showing experimental results for the conventional driver circuit of FIG. 3 to illustrate power conversion rates for different input voltages.

Furthermore, since the device 3 of the present invention is built from two major components, i.e., the direct current voltage boosting circuit 31 and the LDO linear voltage converting circuit 32, the device 3 of this invention can be fabricated at a lower cost as compared to the conventional driver circuit 2 of FIG. 3.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A direct current voltage boosting/bucking device adapted for driving a load, said direct current voltage boosting/bucking device comprising:
   a direct current voltage boosting circuit for boosting an input voltage so as to generate an output voltage higher than the input voltage; and
   a low drop-out (LDO) linear voltage converting circuit adapted to be coupled electrically to the load, said LDO linear voltage converting circuit being coupled electrically to said direct current voltage boosting circuit for converting the output voltage into a load voltage that is to be provided to the load, and controlling said direct current voltage boosting circuit in accordance with a feedback signal from the load such that the output voltage and the load voltage have a minimum drop-out voltage differential therebetween and such that current flow through the load is maintained at a determined level.

2. The direct current voltage boosting/bucking device as claimed in claim 1, wherein said direct current voltage boosting circuit includes:
   a voltage boosting module for receiving and boosting the input voltage; and
   a first comparator coupled electrically to and controlling boosting operation of said voltage boosting module such that the output voltage is slightly higher than the load voltage and such that the output voltage and the load voltage have the minimum drop-out voltage differential therebetween.

3. The direct current voltage boosting/bucking device as claimed in claim 2, wherein said LDO linear voltage converting circuit includes:
   a voltage regulating module for receiving, bucking and regulating the output voltage so as to generate the load voltage;
   a transistor coupled electrically to said first comparator; and
   a second comparator adapted to be coupled electrically to the load so as to receive the feedback signal therefrom, said second comparator being coupled electrically to said transistor and controlling operation of said transistor in accordance with the feedback signal so as to control in turn operation of said first comparator of said direct current voltage boosting circuit.

4. The direct current voltage boosting/bucking device as claimed in claim 3, wherein:
   said first comparator has a first input that receives a first reference voltage, a second input, and an output that is coupled electrically to said voltage boosting module;
   said second comparator having a first input that receives a second reference voltage, a second input that receives the feedback signal, and an output;
   said transistor being a NMOS transistor having a gate connected to said output of said second comparator, and a drain connected to said second input of said first comparator;
   wherein, when the voltage generated by said voltage regulating module has yet to reach the load voltage, the current flow through the load will cause the feedback signal to be lower than the second reference voltage such that said second comparator will cause said transistor to conduct, thereby enabling said first comparator to control said voltage boosting module to increase boosting extent of the input voltage until the voltage generated by said voltage regulating module reaches the load voltage, during which time the current flow through the load will cause the feedback signal to be higher than the second reference voltage such that said second comparator will stop said transistor from conducting, thereby enabling said first comparator to control said voltage boosting module to stop increasing the boosting extent of the input voltage.

5. The direct current voltage boosting/bucking device as claimed in claim 3, the load being a series connection of a high-power light-emitting diode and a resistor, wherein said voltage regulating module is adapted to be coupled electrically to a terminal of the light-emitting diode, and said second comparator is adapted to be coupled electrically to a junction of the resistor and another terminal of the light-emitting diode so as to receive the feedback signal therefrom.

6. The direct current voltage boosting/bucking device as claimed in claim 5, wherein said voltage regulating module includes:
   a PMOS transistor having a source to receive the output voltage of said direct current voltage boosting circuit, a gate, and a drain adapted to be coupled electrically to the light-emitting diode; and
   a resistor connected between said source and said gate of said PMOS transistor.

7. The direct current voltage boosting/bucking device as claimed in claim 2, wherein said voltage boosting module includes a PWM controller, and said first comparator has an output coupled to said PWM controller and controls duty cycle of an output signal generated by said PWM controller.

8. The direct current voltage boosting/bucking device as claimed in claim 2, wherein said voltage boosting module includes a PFM controller, and said first comparator has an output coupled to said PFM controller and controls duty cycle of an output signal generated by said PFM controller.

* * * * *